United States Patent
Piirainen

(10) Patent No.: US 6,721,374 B2
(45) Date of Patent: Apr. 13, 2004

(54) METHOD FOR REDUCING EFFECTS OF INTERFERENCE, AND RECEIVER

(75) Inventor: Olli Piirainen, Oulu (FI)

(73) Assignee: Nokia Corporation, Espoo (FI)

( * ) Notice: Subject to any disclaimer, the term of this patent is extended or adjusted under 35 U.S.C. 154(b) by 29 days.

(21) Appl. No.: 10/066,803

(22) Filed: Feb. 6, 2002

(65) Prior Publication Data

US 2002/0141518 A1 Oct. 3, 2002

Related U.S. Application Data

(63) Continuation of application No. PCT/FI01/00547, filed on Jun. 8, 2001.

(30) Foreign Application Priority Data

Jun. 9, 2000 (FI) ............................................. 20001381

(51) Int. Cl.$^7$ ............................................. H03D 1/04
(52) U.S. Cl. .................................................. 375/346
(58) Field of Search .............................. 375/232, 229, 375/240.29, 346, 348, 350; 379/410, 406, 407, 408

(56) References Cited

U.S. PATENT DOCUMENTS

| | | | | |
|---|---|---|---|---|
| 5,481,565 A | * | 1/1996 | Pal | 375/232 |
| 5,744,742 A | * | 4/1998 | Lindemann et al. | 84/623 |
| 5,832,095 A | * | 11/1998 | Daniels | 381/71.5 |
| 5,946,351 A | * | 8/1999 | Ariyavisitakul et al. | 375/233 |
| 6,091,361 A | * | 7/2000 | Davis et al. | 342/378 |
| 6,157,712 A | * | 12/2000 | Wikstrom | 379/386 |
| 6,163,572 A | | 12/2000 | Velez et al. | |
| 6,233,273 B1 | * | 5/2001 | Webster et al. | 375/148 |
| 6,246,760 B1 | * | 6/2001 | Makino et al. | 379/406.08 |
| 6,272,108 B1 | * | 8/2001 | Chapman | 370/226 |
| 6,320,914 B1 | * | 11/2001 | Dent | 375/302 |
| 6,480,610 B1 | * | 11/2002 | Fang et al. | 381/321 |
| 6,580,701 B1 | * | 6/2003 | Ylitalo et al. | 370/334 |

FOREIGN PATENT DOCUMENTS

| | | |
|---|---|---|
| DE | 198 35 760 | 6/1999 |
| EP | 801 484 | 10/1997 |
| EP | 856 833 | 8/1998 |
| EP | 939 525 | 9/1999 |

\* cited by examiner

*Primary Examiner*—Emmanuel Bayard
(74) *Attorney, Agent, or Firm*—Pillsbury Winthrop LLP

(57) ABSTRACT

The invention relates to a method for reducing the effects of noise and to a receiver comprising at least one sampling means (12) for forming sample signals from a received signal. The receiver also comprises a whitening means (30) for converting the noise in the sample signals to white noise and digital filters (41, 42, 43, 44) for filtering the sample signals comprising white noise. The receiver further comprises a computation means (80) for computing filter tap coefficients from a sample signal. Further still, the receiver comprises summers (51, 52), each one of which is arranged to receive a filtered signal from at least one filter and to sum the signals received from the filters to produce first summed signals. The receiver also comprises a detector (60) for summing the first summed signals to produce the actual summed signal and for detecting the actual summed signal.

36 Claims, 1 Drawing Sheet

METHOD FOR REDUCING EFFECTS OF INTERFERENCE, AND RECEIVER

This application is a continuation of international application PCT/FI01/00547 filed Jun. 8, 2001, which designated the US and was published under PCT article 21(2) in English.

FIELD OF THE INVENTION

The invention relates to a method for reducing the effects of noise.

BACKGROUND OF THE INVENTION

Radio receivers employ various equalizers for reducing inter-symbol interference. Inter-symbol interference is due to linear or non-linear distortions caused to a signal on the radio channel. For example, inter-symbol interference, or ISI, appears when a signal spreads outside the desired time slot. In addition, equalizers are used to reduce noise and interference in the signal.

TDMA (Time Division Multiple Access) systems employ MMSE-DFE equalizers (Minimum Mean-Square Error Decision Feedback Equalizer) to reduce interference. However, the MMSE-DFEs in use do not always produce an optimal result. In addition, the equalizers are most complex to implement and to use in practical applications. In connection with use, complexity means that large matrices have to be processed.

Another problem is encountered when MLSE (Maximum Likelihood Sequence Estimation) or MAP (Maximum a posteriori probability) equalizers are used in connection with multi-level modulations and great channel impulse response delay spreads. Such cases require computing, which increases the number of states needed and also the amount of computation.

An increasing amount of computation is required for determining coefficients for equalizers, but current calculation methods are not very well suited for use when intensive computation is needed. At least in some cases the structures required by the calculation complicate the receiver structure too much. For example, complex computation is needed for computing the tap coefficients of filters used in a receiver. The computation requires large-dimension matrices to be used which slow down the calculation and make it more complicated.

BRIEF DESCRIPTION OF THE INVENTION

It is therefore an object of the invention to provide a method and receiver that allow the above-mentioned problems to be solved. This is achieved with a method disclosed in the preamble, characterized by taking samples from a received signal, the noise in the samples being converted to white noise; filtering each sample signal comprising white noise in a filter; and computing, prior to the filtering of a sample signal, filter tap coefficients from the sample signal for the filter filtering the sample signal to be supplied to the filter; summing the filtered sample signals in groups to provide first summed signals such that each first summed signal comprises a sample signal filtered in at least one filter; summing the first summed signals to provide the actual summed signal, which is detected.

This is also achieved with a method disclosed in the preamble, characterized by forming sample signals by taking samples from a received signal, the noise in the samples being converted to white noise; dividing signals comprising white noise among a plural number of signal groups; filtering sample signals of each signal group in a signal-group-specific filter; and detecting a signal formed of at least one signal of each signal group comprising filtered signals.

The invention further relates to a receiver for reducing the effects of noise.

The receiver of the invention is characterized in that the receiver comprises at least one sampling means for producing sample signals from a received signal; a whitening means for converting the noise in the sample signals to white noise; digital filters for filtering sample signals comprising white noise; a computation means for computing filter tap coefficients for the filter from the sample signal; summers, each one of which is arranged to receive a filtered signal from at least one filter, the summers being arranged to sum the signals they receive from the filters to produce first summed signals; and a detector for summing the first summed signals to produce the actual summed signal and to detect the actual summed signal.

A receiver of the invention is also characterized in that the receiver comprises at least one sampling means for producing sample signals from a received signal; a whitening means for converting the noise in the sample signals to produce white noise and for dividing signals comprising white noise among a plural number of signal groups; a signal-group-specific digital filter for filtering the sample signals in the signal group; and a detector for detecting a signal formed of at least one signal of each signal group comprising filtered signals.

The preferred embodiments of the invention are disclosed in the dependent claims.

An underlying idea of the invention is that the noise in the sample signals is converted to white noise and that, before the sample signal is filtered, filter tap coefficients are calculated from the sample signal comprising white noise for the filter filtering the sample signal.

The method and receiver of the invention provide various advantages. The method allows for a more simplified equalizer implementation. In addition, the computation of filter tap coefficients is easier and speedier than with previous methods since the noise is whitened before the signal is supplied to the filter and before the tap coefficients are computed. The method thus allows matrices of relatively small dimensions to be used for the computation of tap coefficients. Moreover, the method allows to reduce the number of taps in the filter, which further facilitates the computation.

Yet another advantage of the invention is that receiver structure is simplified, which means that a receiver may be implemented using less equalizers than in prior art receivers. In addition, the method of the invention allows the interference tolerance of the receiver to be improved. With the solution of the invention, the performance of the equalizer can be optimized. This means that although the solution of the invention provides low equalizer complexity, nevertheless, the performance of the equalizer can be kept at a good level.

BRIEF DESCRIPTION OF THE DRAWINGS

In the following the invention will be described in greater detail in connection with preferred embodiments and with reference to the accompanying drawings, in which.

DETAILED DESCRIPTION OF THE INVENTION

Figure 1:
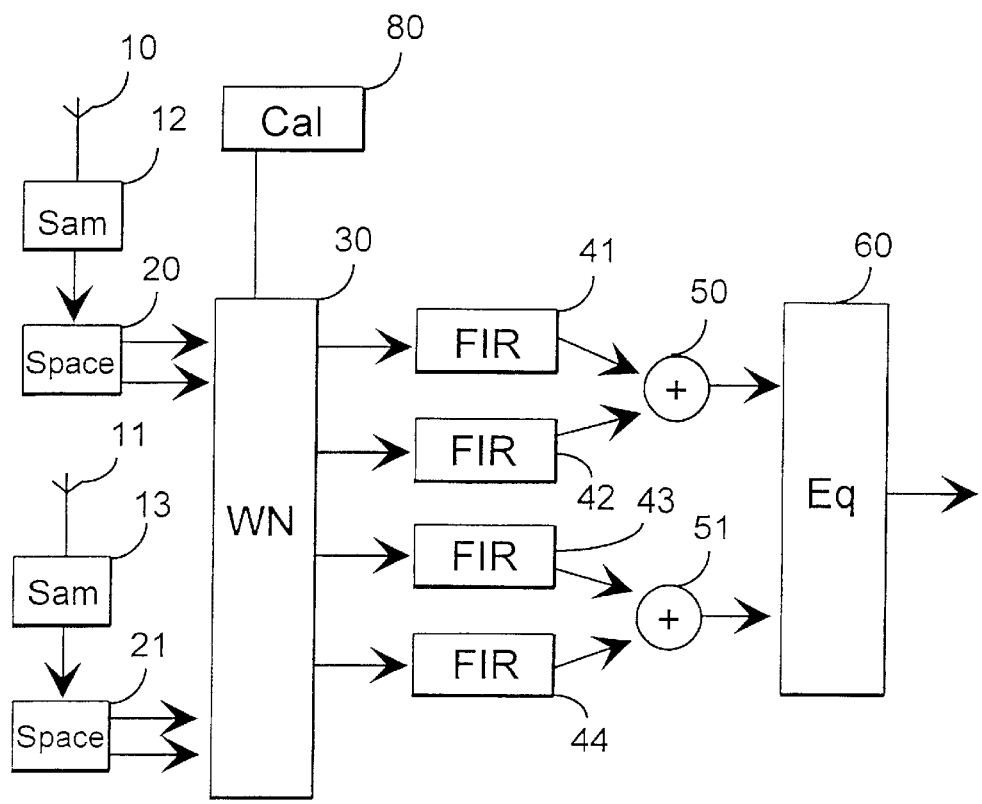
FIG. 1 illustrates an embodiment for implementing a receiver.

FIG. 1 shows a receiver comprising antennas 10, 11, sampling means 12, 13, space means 20, 21, a whitening means 30 for whitening noise, filters 41, 42, 43, 44, summers 50, 51, and an equalizer 60.

The receiver may be located for example at a base station or user equipment, such as a mobile station, of a radio system. However, in practice the receiver provides the best advantage when the receiver is at a base station that comprises a plural number of antennas for receiving a signal. When a signal is received using a plural number of antennas, the best possible diversity gain can be obtained.

FIG. 1 shows that sampling means 12 is connected to antenna 10. It also shows that sampling means 13 is connected to antenna 11. Each sampling means receives a signal from its specific antenna. The sampling means perform oversampling of the signals they receive from their respective antennas.

FIG. 1 also shows that sampling means 12 comprises two outputs connected to space means 20. Sampling means 13 also comprises two outputs connected to space means 21. The sampling means may also comprise more than two outputs. Each space means is also connected to the whitening means 30. In the described embodiment, the whitening means comprises four outputs, each of which is connected to separate filters 41, 42, 43, 44, which are preferably FIR filters (Finite Impulse Response). The described filters are also known as feedforward filters.

The outputs of filters 41 and 42 are both connected to summer 50 and also to summer 51. The output side of both summers is connected to the equalizer 60. The equalizer may be implemented using a Viterbi detector, for example. When in operation, the equalizer takes into account signal diversity. The equalizer may also be implemented using an MLSE or MAP equalizer, for example. In addition, the equalizer may operate on an FSE principle (Fractionally Spaced Equalizer).

In the following, the operation of the receiver will be described from the point of view of a signal received by a first receiver branch which comprises antenna 10. A second receiver branch, which comprises antenna 11, operates on the same principle as the first receiver branch. Antennas 10, 11 may receive a signal containing the same information. In other words, the antennas may simultaneously receive a signal transmitted by the same user equipment.

Information signals arrive at antennas 10, 11 over the radio path and therefore they always contain some disturbance, such as coloured noise, generated by interference. In the embodiment of FIG. 1, the signals received by the antennas are subjected to double oversampling in sampling means 12 and 13. The invention is not, however, restricted to double oversampling alone.

The signal oversampled in sampling means 12 is supplied to the space means 20 which removes the oversampling. In the embodiment of the Figure the oversampled signal is divided in the space means 20 into two different signals y1, y2 which are supplied on separate signal paths to the whitening means 30. Signals y1, y2 may be formed of a signal received by one and the same or different antennas, and they may be obtained as a result of oversampling or without oversampling.

The receiver also comprises a computation means 80 for carrying out the computations described below. The computation means 80 computes filter tap coefficients, for example, for each filter from the sample signals comprising white noise.

In a linear case, signals y1, y2 may be shown in the following signal vector format:

$$y_1 = H_1 x + w_1$$

,where $$y_2 = H_2 x + w_2 \quad (1)$$

$y_1$ and $y_2$ are sample vectors;
x is a vector to be estimated;
$w_1$ and $w_2$ are noise vectors;
H is a known estimation matrix.

In the following, a reciprocal correlation of signal branches of one and the same antenna is computed. If a signal is received using a plural number of antennas, a reciprocal correlation of signal branches of the plural number of antennas is formed. The correlation is calculated using covariance matrix A of noise vectors $w_1$ and $w_2$, the form of the matrix being $$A = E(ee^H), \quad (2)$$

where $$E \text{ is a noise matrix and } e = \begin{pmatrix} w_1^T \\ w_2^T \end{pmatrix} = \begin{pmatrix} (y_1 - H_1 x)^T \\ (y_2 - H_2 x)^T \end{pmatrix}.$$

The samples depend on the inverse matrix of covariance matrix A, the inverse matrix being defined as follows:

$$A^{-1} = T^H D^{-1} T, \quad (3)$$

where
D is a diagonal matrix, $$T = \begin{pmatrix} t_1 \\ t_2 \end{pmatrix},$$

where $t_1, t_2$ are constants. T is in practice a conjugate transpose which is in practice a Hermite matrix.

Formula (3) is used to whiten noise. Formula (3) allows the whitening of noise between separate sample vectors to be determined and calculated.

Figure 2:
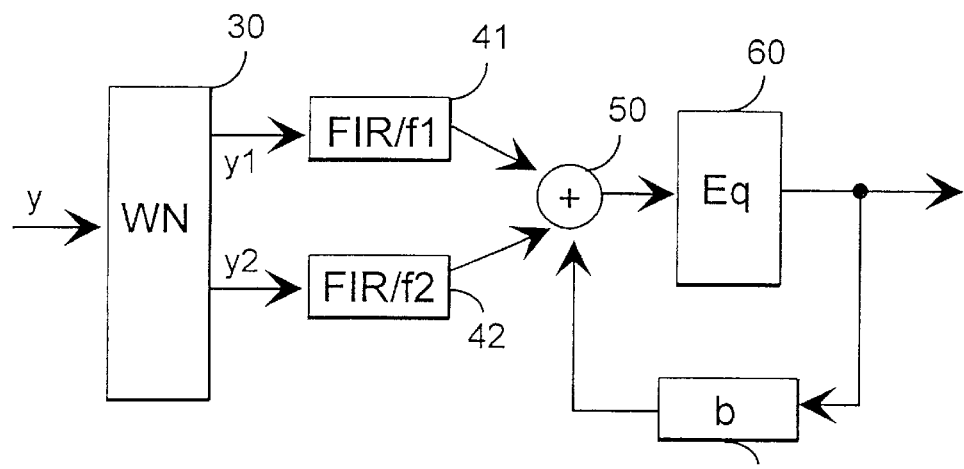
FIG. 2 illustrates another embodiment for implementing a receiver.

FIG. 2 shows another receiver embodiment. The receiver comprises a whitening means 30 for whitening noise, filters 41, 42, a summer 50 and an equalizer 60. In addition, the receiver comprises a filter 70 arranged between the equalizer output and the summer. An output signal of the equalizer is connected through the filter 70 back to the summer which sums the feedback-coupled signal to signals coming from filters 41, 42.

After the whitening of the noise, a Minimum Mean Square Error criterion, or the MMSE criterion, is applied. The criterion involves minimizing the value of J with respect to $f_1$, $f_2$ and b. Symbols $f_n$ denote filter taps: symbol $f_1$ denotes taps of filter 41 and symbol $f_2$ taps of filter 42. Symbol b denotes taps of filter 70. The criterion can be expressed using the following formula:

$$J = E \left| x_i - t_1 \begin{pmatrix} y_1^T \\ y_2^T \end{pmatrix} f_1 - t_2 \begin{pmatrix} y_1^T \\ y_2^T \end{pmatrix} f_2 - x_i b \right|^2. \quad (4)$$

With regard to the above formula, attention is drawn particularly to the use of coefficients $t_1$ and $t_2$. Multiplying carried out using coefficients $t_1$ and $t_2$ diagonalizes the noise matrix. After minimization, the filter taps are computed on the basis of modified impulse responses by applying the following formula:

$$(h_1 h_2) = T(h_{orig\_1} h_{orig\_2}). \quad (5)$$

On the basis of the obtained impulse responses, each sample vector can be written in the following format:

$$t_i \begin{pmatrix} y_1^T \\ y_2^T \end{pmatrix} = H_i x + w_{mod}, \text{ where} \quad (6)$$

$H_i$ is a matrix formed of $h_1$ which, when multiplied by x, yields a convolution result, term $W_{mod}$ is a noise vector obtained on the basis of the multiplication result of matrix T.

Formula (1) can be solved by applying new impulse responses, whereby following formula (7) is obtained for the calculation of FIR filters 41, 42, 43, 44, for example:

$$\begin{pmatrix} f_1 \\ f_2 \end{pmatrix} = \left[ \begin{pmatrix} H_1^* H_1^T + d(1,1)*I & H_1^* H_2^T \\ H_2^* H_1^T & H_2^* H_2^T + d(2,2)*I \end{pmatrix} - \begin{pmatrix} H_1^* E(x^* x_r^T) \\ H_2^* E(x^* x_r^T) \end{pmatrix} I \begin{pmatrix} H_1^* E(x^* x_r^T) \\ H_2^* E(x^* x_r^T) \end{pmatrix}^H \right]^{-1} \begin{pmatrix} H_1^* E(x^* x_i) \\ H_2^* E(x^* x_i) \end{pmatrix}$$

Formula (8) is obtained for filter 70:

$$b = \begin{pmatrix} H_1^* E(x^* x_r^T) \\ H_2^* E(x^* x_r^T) \end{pmatrix}^H \begin{pmatrix} f_1 \\ f_2 \end{pmatrix} \quad (8)$$

The following is valid in the above equation:

$E(x_i^* x_j) = 1$, when $i=j$, $E(x_i^* x_j) = 0$, when $i \neq j$, and $d(i, i)$ are diagonal elements of matrix D.

Instead of a receiver employing the DFE principle, a receiver employing the MLSE or MAP principle may be used, whereby uncorrelated impulse responses of minimum phase are obtained from the following formula:

$$h_{eq} = [1, b]. \quad (9)$$

Some of the above computations are carried out in space means 20, 21 and in whitening means 30. In addition, computation is carried out using a processor and software, for example. The space means and the whitening means can in practice be implemented using an ASIC (Application Specific Integrated Circuit), for example.

If the receiver comprises a plural number of antennas for receiving one and the same information signal, the receiver does not necessarily have to carry out the oversampling, but the receiver can still carry out reducing of signal interference.

In the following, the operation of the receiver will be described in greater detail. As already stated, the sampling means may apply oversampling to the signal it receives. It is assumed that sampling means 12 applies double oversampling, the oversampling being removed in space means 20, for example, to produce two sample signal components.

The sample signal components are then supplied to the whitening means 30 where the noise in each sample signal component is converted to white noise. A first sample signal component comprising white noise is supplied to filter 41 and a second signal component to filter 42. Filters 41, 42 filter the white noise from the sample signal components. Each filter is arranged to receive one whitened sample signal component at a time. The receiver can also be used for reducing the effects of other kinds of interference than just noise.

Before a signal is filtered, the computation means 80 computes filter tap coefficients for both filters. The filter tap coefficients are calculated in advance from a sample signal supplied to the filter. The signals filtered by the filters are summed in the summer 51 to provide a first summed signal which is then transferred to the detector 60.

It is also possible that a plural number of first summed signals are supplied to the detector 60, the signals being summed to produce the actual summed signal which is then detected in the detector. If there is only one first summed signal, it is also the actual summed signal. In other words, the detector can sum signal samples formed of a signal received by one antenna, or signals received by a plural number of antennas.

For example, the receiver can process M signals sampled at symbol intervals in the sampling means 12. Some of the signals may be formed of signals received by different antennas and/or signals propagated through different signal branches. Signals received from different signal branches are separated from one another in the oversampling process.

After the oversampling, the whitening means 30 whitens the noises in M signals with respect to each other. The whitening means 30 divides the whitened signals among N groups, each branch being thus provided with M/N whitened signals.

Each group is filtered in a separate FIR filter. In the above described situation, N FIR filters are needed. During the filtering, each FIR filter decimates the signal rate of the signal it is filtering by M/N. This means that each filter output produces one signal for the M/N input values.

The detector 60 in the receiver receives the N signals and forms one output signal for each above-mentioned signal amount, the output signal being the detected signal. By changing the number of the groups, the decimation can be carried out in stages, which allows the complexity of the different receiver parts and thereby that of the receiver to be reduced.

Although the invention is described above with reference to an example according to the accompanying drawings, it is apparent that the invention is not restricted to it, but may vary in many ways within the inventive idea disclosed in the claims.

What is claimed is:

1. A method for reducing the effects of noise, comprising:
   taking samples of a received signal, the noise in the samples being converted to white noise;
   filtering each sample signal comprising white noise in a filter; and
   computing, prior to the filtering of a sample signal, filter tap coefficients from the sample signal for the filter filtering the sample signal to be supplied to the filter;
   summing the filtered sample signals in groups to provide first summed signals such that each first summed signal comprises a sample signal filtered in at least one filter;
   summing the first summed signals to provide the actual summed signal, which is detected.

2. A method according to claim 1 or 2, wherein sample signals is formed of an oversampled signal.

3. A method according to claim 1, wherein signals are received using a plural number of antennas and sample signals are formed of the signals received by the plural number of antennas.

4. A method according to claim 1, wherein the received signal is received by a receiver and is oversampled, and further comprising removing the oversampling from the signal to provide a plural number of sample signal components, and whitening the sample signal components obtained as a result of the removing.

5. A method according to claim 1, wherein the received signal is received by a receiver and is oversampled, and further comprising removing the oversampling from the signal to provide a plural number of sample signal components, whitening the sample signal components, filtering the whitened signal components obtained as a result of the same removing in separate filters and summing the filtered sample signal components to provide a respective first summed signal.

6. A method according to claim 1, wherein signals which are signal components obtained as a result of the removing of the oversampling of one and the same signal are summed to produce a first summed signal.

7. A method according to claim 1 or 2, wherein the converting of the noise to white noise is carried out in a time domain and a space domain.

8. A method according to claim 1, wherein a channel impulse response is changed to minimum phase, when the filter tap coefficients are calculated.

9. A method according to claim 1, wherein filter tap coefficients are calculated using sample vectors and uncorrelated noise vectors.

10. A method for reducing the effects of noise, comprising:
    forming sample signals by taking samples from a received signal, the noise in the samples being converted to white noise;
    dividing signals comprising white noise among a plural number of signal groups;
    filtering sample signals of each signal group in a signal-group-specific filter; and
    detecting a signal formed of at least one signal of each signal group comprising filtered signals.

11. A method according to claim 10, wherein signals are received using a plural number of antennas and the signals received by different antennas are sampled, the signals being used after the sampling to produce a signal to be detected.

12. A method according to claim 10, wherein signals that have propagated through different signal branches are sampled.

13. A method according to claim 10, wherein filter tap coefficients for the filter are computed, and a channel impulse response is changed to minimum phase during the computation.

14. A method according to claim 10, wherein the signal is decimated during the filtering thereof.

15. A method according to claim 10, wherein at least some signals of all signal groups are used to form the signal to be detected.

16. A method according to claim 10, wherein noises in each sample signal are whitened with respect to each other.

17. A receiver for reducing the effects of noise, comprising:
    at least one sampling means for producing sample signals from a received signal;
    a whitening means for converting the noise in the sample signals to white noise;
    digital filters for filtering sample signals comprising white noise;
    a computation means for computing filter tap coefficients for the filter from the sample signal prior to the filtering of the sample signals;
    summers, each one of which is arranged to receive a filtered signal from at least one filter, the summers being arranged to sum the signals they receive from the filters to produce first summed signals; and
    a detector for summing the first summed signals to produce the actual summed signal and for detecting the actual summed signal.

18. A receiver according to claim 17, wherein the sampling means is arranged to oversample the signal received by the receiver and to form sample signal components of the signal it has oversampled.

19. A receiver according to claim 17, the receiver comprising also at least one antenna and the whitening means is arranged to whiten the sample signals formed of signals received by different antennas.

20. A receiver according to claim 17, wherein the sampling means is arranged to oversample a signal received by the receiver, the receiver comprising a space means arranged to remove the oversampling of the oversampled signal.

21. A receiver according to claim 17, wherein the sampling means is arranged to oversample a signal received by the receiver, and the receiver comprises a space means arranged to remove the oversampling of the oversampled signal and to transfer the sample signal components obtained as a result of the removing to the whitening means for whitening.

22. A receiver according to claim 17, the receiver comprising also the sampling means arranged to oversample a signal received by the receiver, the receiver comprising a space means arranged to remove the oversampling of the oversampled signal and to transfer the sample signal components obtained as a result of the removing to the whitening means for whitening, and each filter is arranged to filter a separate sample signal component.

23. A receiver according to claim 17, wherein the summer is arranged to sum signals which are signal components obtained as a result of the removing of the oversampling of one and the same signal.

24. A receiver according to claim 17, the receiver comprising also at least one antenna and the detector is arranged to sum the signal samples formed of a signal received by a single antenna, or of signals received by a plural number of antennas.

25. A receiver according to claim 17, wherein the filter is arranged to receive one whitened signal sample at a time.

26. A receiver according to claim 17, wherein the whitening means is arranged to convert coloured noise to white noise in a time domain and a space domain.

27. A receiver according to claim 17, wherein the computation means is arranged to compute filter tap coefficients from a minimum-phase channel impulse response.

28. A receiver according to claim 17, wherein the computation means is arranged to compute filter tap coefficients using sample vectors and uncorrelated noise vectors.

29. A receiver for reducing the effects of noise, comprising:
    at least one sampling means for producing sample signals from a received signal;

a whitening means for converting the noise in the sample signals to produce white noise and for dividing signals comprising white noise among a plural number of signal groups;

a signal-group-specific digital filter for filtering the sample signals in the signal group; and a detector for detecting a signal formed of at least one signal of each signal group comprising filtered signals.

30. A receiver according to claim 29, the receiver comprising also at least one antenna and the sampling means is arranged to sample signals received by different antennas and the receiver is arranged to form a signal to be detected from the sampled signals.

31. A receiver according to claim 29, wherein the sampling means is arranged to sample signals that have propagated through different signal branches.

32. A receiver according to claim 29, the receiver comprising also a computation means for computing filter tap coefficients.

33. A receiver according to claim 29, the receiver comprising also a computation means for computing filter tap coefficients from the sample signal, which computation means is arranged to change a channel impulse response to minimum phase.

34. A receiver according to claim 29, wherein each filter is arranged to decimate the signal it has filtered.

35. A receiver according to claim 29, which receiver is arranged to use at least one signal from each signal group to form a signal to be detected.

36. A receiver according to claim 29, wherein the whitening means is arranged to whiten the noises in each sampled signal with respect to one another.

* * * * *